United States Patent
Yang et al.

(10) Patent No.: US 10,769,784 B2
(45) Date of Patent: Sep. 8, 2020

(54) IMAGE ANALYZING METHOD AND ELECTRICAL DEVICE

(71) Applicant: METAL INDUSTRIES RESEARCH & DEVELOPMENT CENTRE, Kaohsiung (TW)

(72) Inventors: Sheng-Hong Yang, Kaohsiung (TW); Jian-Jia Zeng, Kaohsiung (TW); Bo-Wei Pan, Kaohsiung (TW)

(73) Assignee: METAL INDUSTRIES RESEARCH & DEVELOPMENT CENTRE, Kaohsiung (TW)

( * ) Notice: Subject to any disclaimer, the term of this patent is extended or adjusted under 35 U.S.C. 154(b) by 66 days.

(21) Appl. No.: 16/228,778

(22) Filed: Dec. 21, 2018

(65) Prior Publication Data

US 2020/0202514 A1 Jun. 25, 2020

(51) Int. Cl.
*G06T 7/00* (2017.01)
*G06K 9/62* (2006.01)
(Continued)

(52) U.S. Cl.
CPC .......... *G06T 7/0012* (2013.01); *G06K 9/6217* (2013.01); *G06N 3/08* (2013.01); *G06T 7/11* (2017.01)

(58) Field of Classification Search
CPC .................. G06T 7/0012; G06T 7/11; G06T 2207/10016; G06T 2207/20021; G06T 7/246; G06T 7/20; G06T 2207/10024; G06T 2207/20081; G06T 2207/30232; G06T 2207/20084; G06T 7/254; G06T 7/00; G06T 7/73; G06T 7/174;
(Continued)

(56) References Cited

U.S. PATENT DOCUMENTS

2012/0122078 A1* 5/2012 Patterson ............... G16H 50/20
435/5
2015/0205997 A1* 7/2015 Ma ..................... G06K 9/00261
382/118
(Continued)

FOREIGN PATENT DOCUMENTS

CN      103379255 A    10/2013
TW      201102939 A    1/2011
(Continued)

OTHER PUBLICATIONS

Wang CN 106803090 Image recognition method and device, published on Jun. 6, 2017 (total 32 pages) Optained from https://translate.google.com/translate?hl=en&sl=zh-CN&u=https://www.google.com/patents/CN105787439A%3Fcl%3Dzh%26dq%3D106803090&prev=search (Year: 2017).*
(Continued)

*Primary Examiner* — Nimesh Patel
(74) *Attorney, Agent, or Firm* — CKC & Partners Co., LLC

(57) ABSTRACT

An image analyzing method is provided and includes: extracting a first feature vector according to global information of a digital image; dividing the digital image into multiple regions, and inputting each region into a convolutional neural network to obtain a second feature vector; merging the first feature vector with the second feature vectors to obtain a third feature vector; and performing an image analyzing process according to the third feature vector.

4 Claims, 3 Drawing Sheets

Extract a first feature vector according to global information of a digital image — 301

Dividing the digital image into regions, and inputting each of the regions into a convolutional neural network to obtain a second feature vector — 302

Merging the first feature vector with the second feature vectors to obtain a third feature vector — 303

Performing an image analyzing process according to the third feature vector — 304

(51) Int. Cl.
*G06T 7/11* (2017.01)
*G06N 3/08* (2006.01)

(58) Field of Classification Search
CPC ..... G06T 7/248; G06T 17/00; G06T 2200/04; G06T 2207/20221; G06T 2207/20224; G06T 7/292; G06T 7/55; G06T 9/00; G06N 3/08; G06N 3/0454; G06N 20/00; G06N 5/003; G06N 3/04; G06N 20/20; G06N 5/046; G06N 7/005; G06N 3/02; G06N 3/10; G06K 9/6217; G06K 9/4671; G06K 9/4642; G06K 9/00771; G06K 9/6211; G06K 9/00744; G06K 9/00288; G06K 9/481; G06K 9/52; G06K 9/00711; G06K 9/00281; G06K 9/00751; G06K 2009/6213; G06K 9/4604; G06K 9/6212; G06K 9/6282; G06K 9/00335; G06K 9/00664; G06K 2009/00738; G06K 9/00268; G06K 9/00369; G06K 9/0063; G06K 9/623; G06K 2209/19; G06K 9/00228; G06K 9/00275; G06K 9/00342; G06K 9/00362; G06K 9/00375; G06F 16/5838; G06F 16/583; G06F 16/29; G06F 16/9537; G06F 16/56; G06F 16/784; G06F 16/58; G06F 16/70; G06F 19/321; G06F 21/32; G06F 3/017; G06F 16/5854
See application file for complete search history.

(56) References Cited

U.S. PATENT DOCUMENTS

| | | | |
|---|---|---|---|
| 2016/0171684 A1* | 6/2016 | De Haan | G06K 9/4652 |
| | | | 382/103 |
| 2016/0189381 A1* | 6/2016 | Rhoads | G06T 7/33 |
| | | | 382/103 |
| 2016/0225149 A1* | 8/2016 | Tearney | G06T 7/0014 |
| 2017/0018075 A1* | 1/2017 | Middlebrooks | A61B 6/502 |
| 2017/0147609 A1* | 5/2017 | Lin | G06K 9/6215 |
| 2017/0220000 A1* | 8/2017 | Ozcan | H04N 5/23238 |
| 2017/0294040 A1* | 10/2017 | Song | G16H 10/60 |
| 2017/0309017 A1* | 10/2017 | Cheng | G06K 9/40 |
| 2020/0074243 A1* | 3/2020 | Gu | G06K 9/6267 |

FOREIGN PATENT DOCUMENTS

| | | |
|---|---|---|
| TW | 201719572 A | 6/2017 |
| TW | I594207 B | 8/2017 |
| TW | 201816670 A | 5/2018 |

OTHER PUBLICATIONS

Jia-Hong Zhang et al., "Fast Automatic Segmentation of Cells and Nucleuses in Large-scale Liquid-based Monolayer Smear Images", Published in 2017 International Conference on Image and Vision Computing New Zealand (IVCNZ), Dec. 4, 2017.

* cited by examiner

IMAGE ANALYZING METHOD AND ELECTRICAL DEVICE

BACKGROUND

Field of Invention

The present invention relates to an image analyzing method. More particularly, the present invention relates to the image analyzing method using a convolutional neural network for large digital images.

Description of Related Art

In recent years, convolutional neural networks have been successfully applied in various fields. One advantage of the convolutional neural networks is that they can automatically extract feature vectors of images without the need of experts to determine the feature vectors. However, the convolutional neural networks still have limitations in some applications. For example, medical images generally have large sizes, so they are often limited by hardware specifications and cannot be applied to conventional convolutional neural networks. How to solve this problem is a topic of concern to people in this field.

SUMMARY

Embodiments of the disclosure provide an image analyzing method for an electrical device. The image analyzing method includes: extracting a first feature vector according to global information of a digital image; dividing the digital image into regions, and inputting each of the regions into a convolutional neural network to obtain a second feature vector; merging the first feature vector with the second feature vectors to obtain a third feature vector; and performing an image analyzing process according to the third feature vector.

In some embodiments, the operation of inputting each of the regions into the convolutional neural network to obtain the second feature vector includes: inputting each of the region into the convolutional neural network to obtain feature maps; and transforming each of the feature map into a feature value, wherein the feature values constitute corresponding one of the second feature vectors.

In some embodiments, the step of transforming each of the feature maps into the feature value includes: applying a global filter to the feature maps to obtain the feature values, wherein a size of the global filter is identical to a size of the feature maps.

In some embodiments, the digital image is a medical image. The first feature vector includes a nuclear area ratio, an average nuclear brightness, an average cytoplasmic brightness, or a nuclear and cytoplasmic brightness ratio.

In some embodiments, the regions are not overlapped with each other.

From another aspect, an electrical device is provided. The electrical device includes a memory storing instructions and a processor for executing the instructions to perform the image analyzing method.

BRIEF DESCRIPTION OF THE DRAWINGS

The invention can be more fully understood by reading the following detailed description of the embodiment, with reference made to the accompanying drawings as follows.

DETAILED DESCRIPTION

Specific embodiments of the present invention are further described in detail below with reference to the accompanying drawings, however, the embodiments described are not intended to limit the present invention and it is not intended for the description of operation to limit the order of implementation. Moreover, any device with equivalent functions that is produced from a structure formed by a recombination of elements shall fall within the scope of the present invention. Additionally, the drawings are only illustrative and are not drawn to actual size.

The using of "first", "second", "third", etc. in the specification should be understood for identifying units or data described by the same terminology, but are not referred to particular order or sequence.

Figure 1:
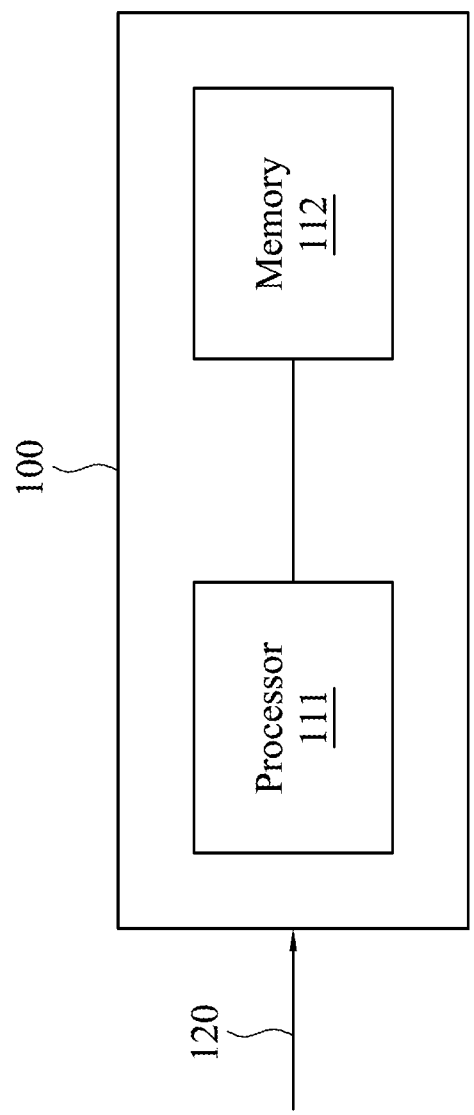
FIG. 1 is a schematic diagram of an electrical device in accordance with an embodiment.

FIG. 1 is a schematic diagram of an electrical device in accordance with an embodiment. Referring to FIG. 1, an electrical device 100 may be implemented as a personal computer, a laptop, an industrial computer, a server, or any electrical device with computation ability, which is not limited in the invention. The electrical device 100 includes a processor 111 and a memory 112. The processor 111 may be, but not limited, a central processing unit, a microprocessor, a microcontroller, a digital signal processor, an image processor, an application-specific integrated circuit, etc. The memory 112 may be, but not limited, volatile or non-volatile memory. The memory 112 stores instructions which are executed by the processor 111 to perform an image analyzing method on a digital image 120. In the embodiments, the digital image 120 is a medical image of cells, and the image analyzing method is used to calculate a cancer index. However, the digital image 120 may be a portrait image, a landscape image, a satellite image, an industrial image in other embodiments. The content, format, and size of the digital image 120 are not limited in the invention. The image analyzing method will be described in detail below.

Figure 2:
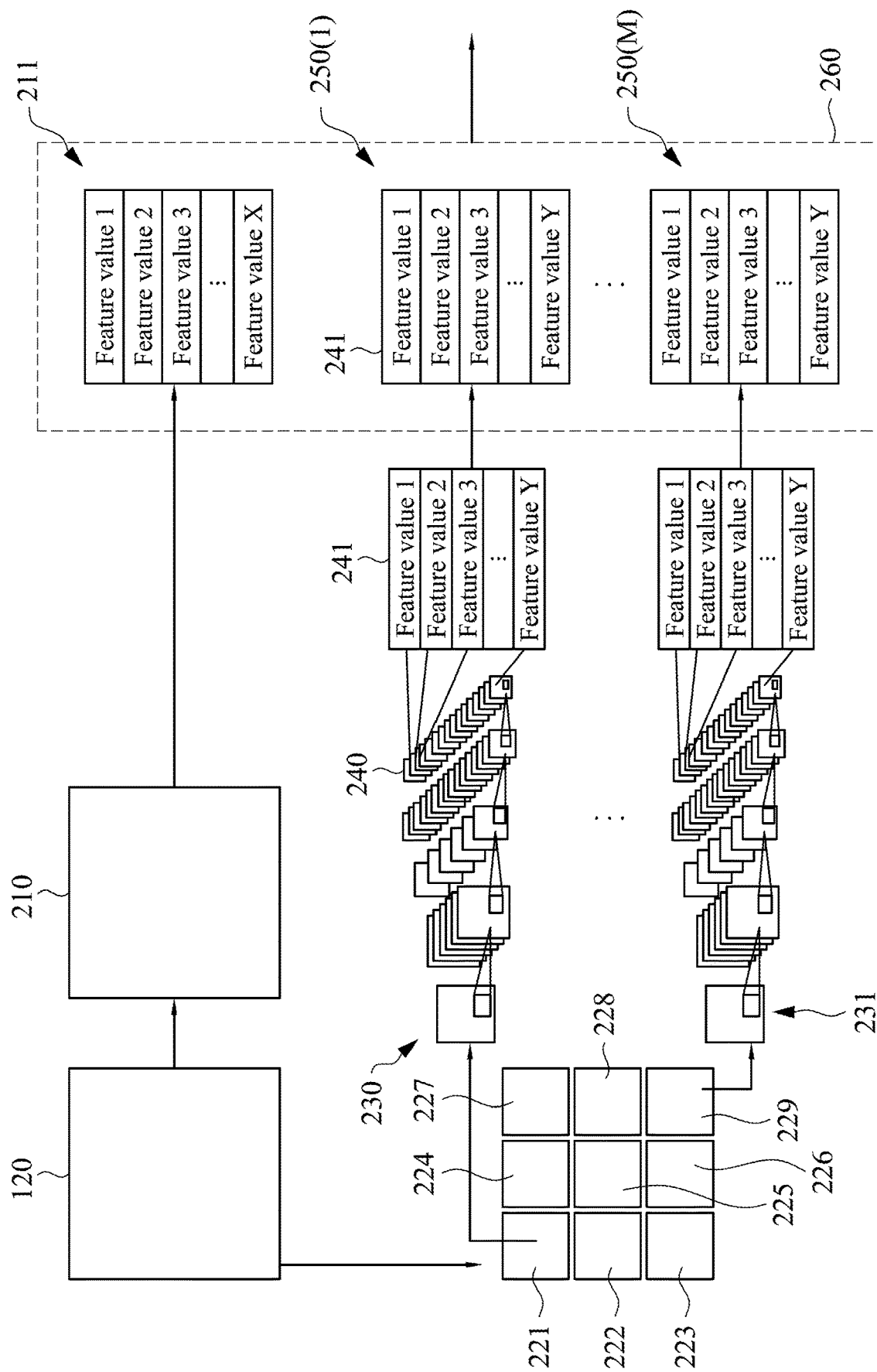
FIG. 2 is a schematic diagram of an image analyzing method in accordance with an embodiment.

FIG. 2 is a schematic diagram of an image analyzing method in accordance with an embodiment. Referring to FIG. 2, a feature vector 211 is extracted according to global information of the digital image 120. Herein, "global information" means information related to all pixels of the digital image 120 instead of local information. For example, global edge information is related to performing edge detection on the digital image 120, and then sum up or average all of the detection results; global brightness information is related to sum up or average the brightness of all pixels of the digital image 120, and so on. In the embodiment, a segmentation algorithm is performed on the digital image 120 to obtain multiple cells, nucleus, cytoplasm, etc. Taiwan Patent number 1594207 is adopted for the segmentation algorithm in the embodiment, but other segmentation algorithms may be adopted in other embodiments. A digital image 210 is obtained after the segmentation algorithm is performed. Next, a nuclear area ratio, an average nuclear brightness, an average cytoplasmic brightness, and a nuclear and cytoplasmic brightness ratio are obtained. In detail, the nuclear area ratio refers to the ratio of the area of the nucleus to the area of the cell; the average nuclear brightness refers to the average of the gray levels of all nuclei; the average cytoplasmic brightness refers to the average of the gray levels of all cytoplasm; the nuclear and cytoplasmic brightness ratio refers to the ratio of average nuclear brightness to average cytoplasmic brightness. Note that these ratios and brightness are calculated according to all cells of the digital image 210, and therefore they are "global information" compared to some conventional art only using single cell (i.e. local information) to calculate the ratio or brightness. In other words, the ratio and brightness calculated in the embodiment can represent characteristic of the whole digital image 120. In the embodiments, the feature vector 211 includes X feature values (labeled as feature value 1 to feature value X) where X is a positive integer, but the value of X is not limited in the invention.

On the other hand, the digital image 120 is divided into M regions where M is a positive integer, but the value of M is not limited in the invention. In the embodiment, the digital image 120 is divided into regions 221-229 that are not overlapped with each other. Next, each of the regions 221-229 is inputted into a convolutional neural network to obtain a feature vector. Since there are M regions, a total of M feature vectors 250(1)-250(M) are generated. In some embodiments, the regions 221-229 are inputted into different convolutional neural networks. For example, the region 221 is inputted into a convolutional neural network 230, and the region 229 is inputted into another convolutional neural network 231. The depths of the convolutional neural network 230 may be different from that of the convolutional neural network 231, and the number of pooling layers of the convolutional neural network 230 may be different from that of the convolutional neural network 231. Note that the convolutional neural network 230 and the convolutional neural network 231 are trained independently, and therefore the trained parameters therein may be different.

In general, a convolutional neural network includes convolutional layers, pooling layers and transfer functions. The transfer function, such as rectified linear unit (ReLU), is disposed in a neuron of the convolutional layers, but other types of transfer function may be adopted in other embodiments. Feature maps are obtained after the operations of the convolutional layers and the pooling layers. For example, if 20 filters are designed for one convolutional layer, then a total of 20 feature maps are obtained after the operation of this convolutional layer. People in the art should be able to understand the principle of the convolutional neural network, and therefore the details will not be described. Take the convolutional neural network 230 as an example, the end (i.e. last convolutional layer) of the convolutional neural network 230 has Y filters, and therefore Y feature maps are generated where Y is a positive integer. In particular, each feature map is transformed into one feature value. For example, a feature map 240 is generated at the end of the convolutional neural network 230, and the feature map 240 is transformed into a feature value 241. In some embodiments, a global filter is applied to the feature map 240 to obtain the feature value 241. The size of the global filter is identical to the size of the feature map 240. For example, the size of the feature map 240 is 64*64, and the size of the global filter is also 64*64 with 64*64=4096 coefficients. When the global filter is applied to the feature map 240, the global filter outputs the feature value 241. In some embodiments, the average of all values of the feature map 240 is calculated as the feature value 241. After transforming the Y feature maps into Y feature values, these Y feature values (labeled as feature value 1 to feature value Y) constitute a feature vector 250(1). In some embodiments, normalization such as a softmax function is applied to the Y feature values, but the invention is not limited thereto. Similarly, the same procedure is performed to the convolutional neural network 231 to generate a feature vector 250(M), and the description will not be repeated.

Next, the feature vector 211 is merged with the feature vectors 250(1)-250(M) to obtain a feature vector 260. In the embodiment of FIG. 2, the length of the feature vector 211 is X and the length of each of the feature vectors 250(1)-250(M) is Y, and therefore the length of the merged feature vector 260 is X+M*Y. Next, an image analyzing process is performed according to the feature vector 260. The image analyzing process is, for example, a test phase of a machine learning algorithm such as support vector machine (SVM) or another convolutional neural network. The image analyzing process is used to calculate a cancer index in some embodiments, or is used for object detection, object recognition, segmentation, clustering, etc. which is not limited in the invention.

Figure 3:
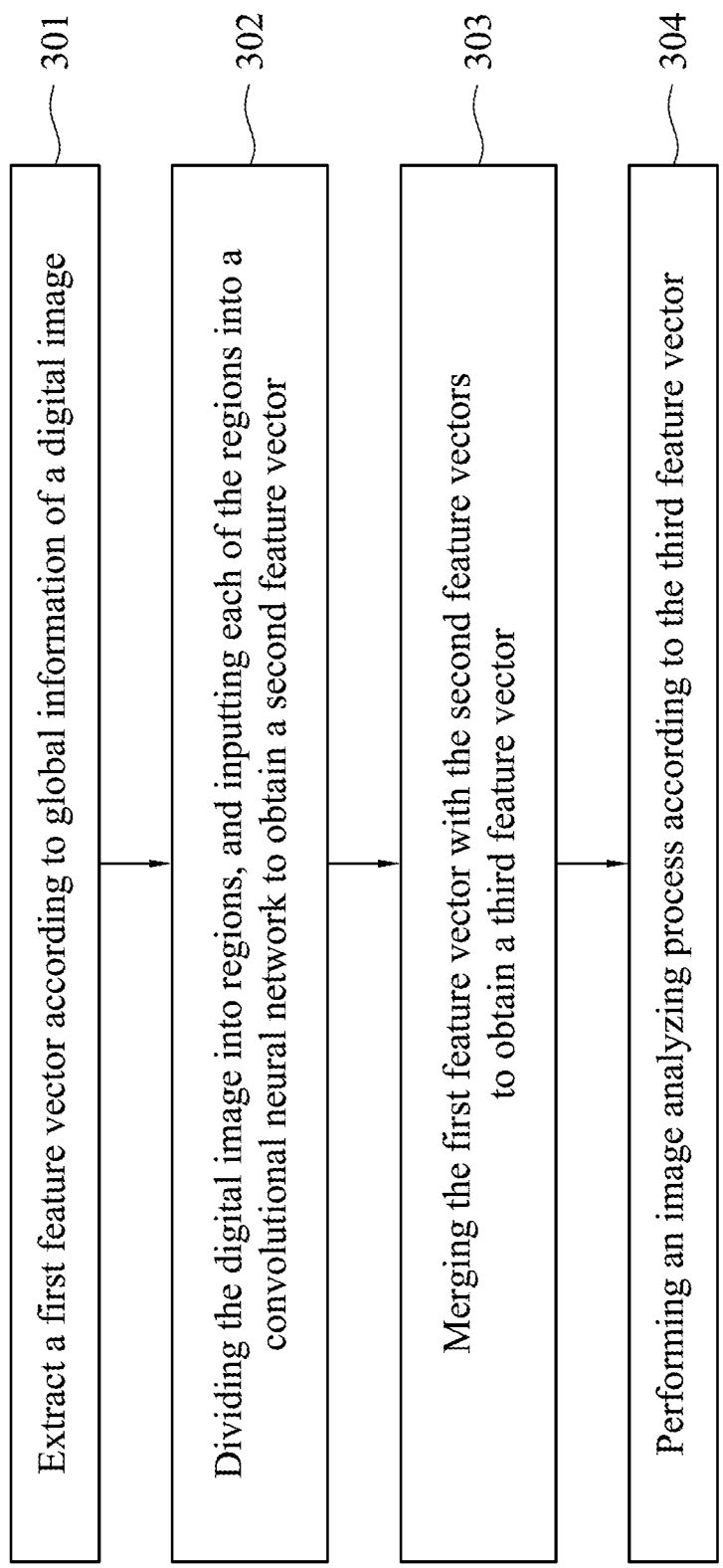
FIG. 3 is a flow chart of an image analyzing method in accordance with an embodiment.

FIG. 3 is a flow chart of an image analyzing method in accordance with an embodiment. In step 301, a first feature vector is extracted according to global information of a digital image. In step 302, the digital image is divided into regions, and each region is inputted into a convolutional neural network to obtain a second feature vector. In step 303, the first feature vector is merged with the second feature vectors to obtain a third feature vector. In step 304, an image analyzing process is performed according to the third feature vector. However, all the steps in FIG. 3 have been described in detail above, and therefore they will not be repeated. Note that the steps in FIG. 3 can be implemented as program codes or circuits, and the disclosure is not limited thereto. In addition, the method in FIG. 3 can be performed with the aforementioned embodiments, or can be performed independently. In other words, other steps may be inserted between the steps of the FIG. 3.

Note that in the aforementioned embodiments, the feature vector 211 is generated according to global information while the feature vectors 250(1)-250(M) are generated according to the regions 221-229 (i.e. local information), and thus both of global information and local information is considered. In addition, since the digital image 120 is divided into several regions 221-229, and size of each region is more likely to meet the hardware limitation of the convolutional neural networks. For example, the memory of a convolutional neural network circuit may have a memory limit (e.g. 1G bytes), and the size of a typical medical image is far beyond the memory limit. Based on the disclosed method, each region can meet the memory limit of the convolutional neural network circuit. On the other hand, the feature maps are transformed into feature values to generate feature vectors 250(1)-250(M) that are then merged with the feature vector 211. If the feature maps are merged with the feature vector 211, the analyzing result may be biased to the feature maps because the number of values in the feature maps is much greater than the number of values in the feature vector 211. The bias is avoided by transforming the feature maps into feature values.

Although the present invention has been described in considerable detail with reference to certain embodiments thereof, other embodiments are possible. Therefore, the spirit and scope of the appended claims should not be limited to the description of the embodiments contained herein. It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. An image analyzing method for an electrical device, wherein the image analyzing method comprises:
    extracting a first feature vector according to global information of a digital image, wherein the digital image is a medical image, and the first feature vector consists of a nuclear area ratio, an average nuclear brightness, an average cytoplasmic brightness, and a nuclear and cytoplasmic brightness ratio;
    dividing the digital image into a plurality of regions, and inputting each of the regions into a convolutional neural network to obtain a plurality of feature maps;
    applying a global filter to the feature maps to obtain a plurality of feature values, wherein a size of the global filter is identical to a size of each of the feature maps, and the feature values corresponding to one of the regions constitute one of a plurality of second feature vectors;
    merging the first feature vector with the second feature vectors to obtain a third feature vector; and
    performing an image analyzing process according to the third feature vector.

2. The image analyzing method of claim 1, wherein the nuclear area ratio is a ratio of an area of nuclei to an area of cells; the average nuclear brightness is an average of gray levels of the nuclei; the average cytoplasmic brightness is an average of gray levels of cytoplasm; and the nuclear and cytoplasmic brightness ratio is a ratio of the average nuclear brightness to the average cytoplasmic brightness.

3. The image analyzing method of claim 1, wherein the regions are not overlapped with each other.

4. An electrical device, comprising:
    a memory, storing a plurality of instructions; and
    a processor, executing the instructions to perform steps of:
        extracting a first feature vector according to global information of a digital image, wherein the digital image is a medical image, and the first feature vector consists of a nuclear area ratio, an average nuclear brightness, an average cytoplasmic brightness, and a nuclear and cytoplasmic brightness ratio;
        dividing the digital image into a plurality of regions, and inputting each of the regions into a convolutional neural network to obtain a plurality of feature maps;
        applying a global filter to the feature maps to obtain a plurality of feature values, wherein a size of the global filter is identical to a size of each of the feature maps, and the feature values corresponding to one of the regions constitute one of a plurality of second feature vectors;
        merging the first feature vector with the second feature vectors to obtain a third feature vector; and
    performing an image analyzing process according to the third feature vector.

* * * * *